March 27, 1962  N. ANDERSON  3,027,133
BUTTERFLY VALVES
Filed Feb. 3, 1959
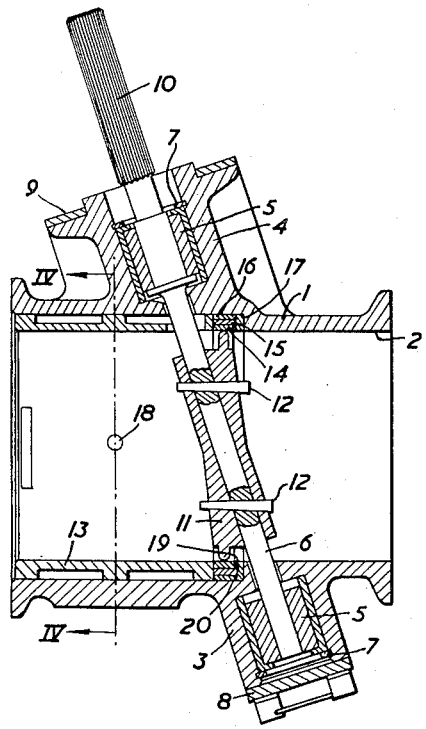
FIG. 1.
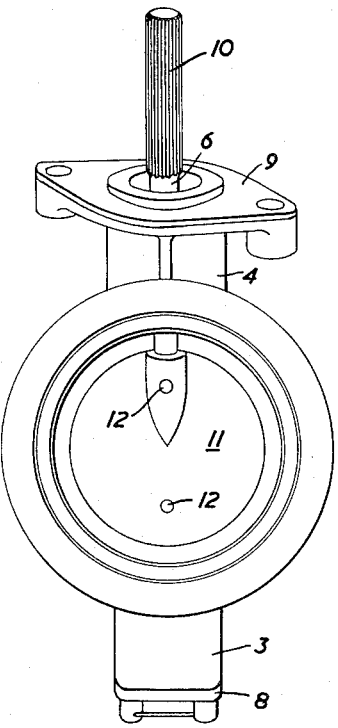
FIG. 2.
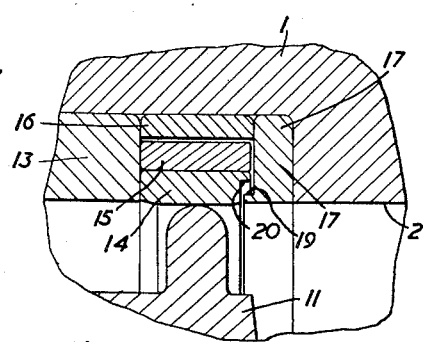
FIG. 3.
FIG. 5.
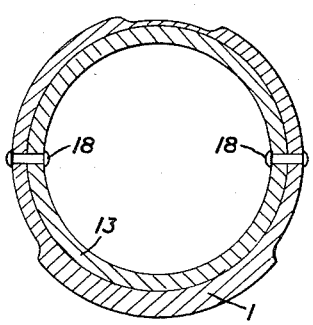
FIG. 4.
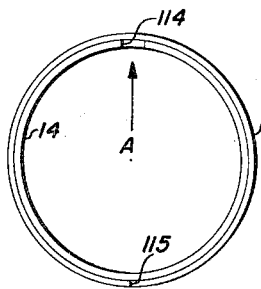
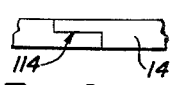
FIG. 6.
INVENTOR
NORMAN ANDERSON
BY
Irwin S. Thompson
ATTORNEY though with properly maintained angular separation of the respective ring gaps a sloping or inclined straight gap could be utilized for the outer ring, it is preferred that the straight gap ring should have said gap arranged to run parallel to the bore axis, i.e. normal to the edges of the ring.

With advantage the edges of the inner surfaces of the inner ring may be chamfered in order to afford an easy entry for the disc or butterfly as it moves to a position normal to the bore.

The invention will now be further described with reference to the accompanying drawings which illustrate, by way of example, one form of butterfly valve according to the invention, and in which:

FIGURE 1 is an axial cross-sectional view of the valve,
FIGURE 2 is an end view thereof,
FIGURE 3 is a detail view of a portion of FIGURE 1 to a larger scale,
FIGURE 4 is a fragmentary cross-sectional view on the line IV—IV of FIGURE 1,
FIGURE 5 is an end view of two concentrically arranged sealing rings, and
FIGURE 6 is a fragmentary view on a larger scale in the direction of the arrow A in FIGURE 5 showing a stepped gap in the inner sealing ring.

3,027,133
BUTTERFLY VALVES

Norman Anderson, Hanworth, England, assignor to Sir George Godfrey & Partners (Holdings) Limited, Hanworth, England
Filed Feb. 3, 1959, Ser. No. 790,964
Claims priority, application Great Britain Feb. 5, 1958
5 Claims. (Cl. 251—173)

This invention relates to butterfly valves used, for example, as control or shut-off valves in fluid flow ducts. It is more especially, but not exclusively, concerned with butterfly valves employed as shut-off valves in ducts carrying pressure air or other gases.

There is a type of butterfly valve in which the pivot axis of the disc or butterfly is set at an angle to a plane normal to the axis of the bore in which the butterfly valve is arranged. This type of valve possesses the advantage that the complete circumference of the disc or butterfly is available for sealing purposes since the spindle upon which the disc or butterfly is mounted lies at an angle to the plane of the disc or butterfly and therefore does not break into the circumferential sealing edge of the latter. It is with this type of butterfly valve that the invention deals.

With a view to improving the sealing afforded by butterfly valves of the foregoing type the disc or butterfly has been arranged to seal against a gapped spring ring arranged in an annular recess in the bore and which resiliently embraces the circumferential sealing edge of the disc or butterfly when the latter is in its fully closed position, i.e. normal to the axis of the bore. However, even with such an arrangement leakage occurs through the gap of the spring ring and the main object of the present invention is to provide an improved arrangement whereby leakage is completely avoided or reduced to the minimum.

According to the invention a butterfly valve of the foregoing type is provided wherein the bore which the disc or butterfly is arranged to seal comprises a plurality of gapped spring rings coaxially arranged one within the other, the arrangement being such that each gapped spring ring seals the leak path constituted by the gap of the other, or adjacent, ring.

The spring rings are preferably so disposed that their gaps are angularly separated from each other with respect to the axis of the bore. If desired the spring rings may comprise an inner ring having a stepped type of gap and an outer ring having a straight gap. Although with properly maintained angular separation of the respective ring gaps a sloping or inclined straight gap could be utilized for the outer ring, it is preferred that the straight gap ring should have said gap arranged to run parallel to the bore axis, i.e. normal to the edges of the ring.

The butterfly valve illustrated has been developed for application in an airborne system embodying an air-cycle refrigerator for supplying cooling air to an aircraft cabin, the butterfly valve being employed as a shut-off valve in an air duct between the compressor of a gas turbine engine of the aircraft, or a separate blower driven by such engine, from which the throughput air for the turbine of the air-cycle refrigerator is derived, and a heat exchanger arranged in the duct between the compressor or blower and the refrigeration turbine.

The body 1 of the butterfly valve is of tubular form having a bore 2 of the appropriate diameter for coaxial connection between suitably separated portions of the air duct. The cylindrical body 1 is formed with two external diametrically opposite bosses 3 and 4 aligned with each other but staggered in the direction of the axis of the bore 2 of the body. These bosses 3 and 4 are bored to provide suitable bearing and sealing arrangements 5 for the spindle 6 of the butterfly valve which is thus inclined at an angle of some 25° to a plane normal to the axis of the bore 2. Each of the bearing and sealing arrangements 5 is seated in a counterbore in the corresponding boss 3 or 4, being held therein by means of a circlip 7.

One end of the spindle 6 has a blind mounting in its bearing and sealing arrangement 5, the bore in the boss 3 being closed by an end cover or plug 8. The other end of the spindle 6 is mounted in a similar bearing and sealing arrangement 5 received in the bore of the boss 4 but this end of the spindle 6 projects freely from the latter to enable operation of the valve by a valve actuator mounted upon a flanged outer face 9 of the boss, this actuator not being illustrated. The projecting portion of the spindle 6 is formed with a series of longitudinal serrations 10 for driving engagement with the valve actuator. One of the serrations 10 is omitted and the actuator correspondingly formed so that, when coupled together, correct angular alignment of the spindle 6 and the valve actuator is assured.

The disc or butterfly 11 is mounted on the central portion of the spindle 6 extending across the bore 2 of the body by taper pins 12 extending through bores in the disc 11 and spindle 6. With the butterfly valve in its closed position the disc or butterfly 11 lies normal to the axis of the bore 2 of the body 1 of the butterfly valve and the latter is connected in the air duct so that the blind end of the actuating spindle adjacent the boss 3 is disposed upstream, or on the high pressure side, of the disc or butterfly 11, the actuator end of the spindle consequently being on the downstream or low pressure side of the latter. This arrangement prevents leakage along the spindle 6 from the valve body 1 when the valve is closed.

From its downstream end the bore 2 of the body 1 is counterbored to receive a sleeve 13 which is a shrink fit in the bore 2 and the inner cylindrical surface of which forms the effective bore of the body 1 at this end of the valve. The sleeve 13 is shorter than the length of the counterbore and is utilized to sandwich between its upstream end and the shoulder of the counterbore a group of rings constituting a sealing arrangement for the circumferential edge of the disc or butterfly 11.

This sealing arrangement, which is shown in detail in FIGURES 3, 5 and 6, comprises an inner spring ring 14 having a gap 114 of stepped configuration to prevent axial leakage therethrough and being defined by end portions provided with overlapping tongues, the engaging faces of said tongues slidably contacting in a plane normal to the flow axis. Around this stepped gap ring 14 is a further outer spring ring 15 having a straight gap 115 which preferably runs parallel with the axis of the ring. It will be seen that with such an arrangement, even if the straight gap of the outer ring 15 overlies the stepped gap of the inner ring 14, complete sealing of the leakage path through either ring will be effected by the other. On assembly the rings 14 and 15 are arranged with their respective gaps diametrically opposed as shown in FIGURE 6.

Around the outer, or straight gap, ring 15 there is disposed a spacing sleeve 16 the outer cylindrical surface of which lies against the surface of the counterbore of the body. The spacing sleeve abuts at its upstream edge an end ring 17 which lies against the flat annular face or shoulder of the counterbore, the spacing sleeve 16 and this end ring 17 being trapped between the shoulder and the sleeve 13 when fitting the latter. After such fitting the sleeve 13 is fixed to the body 1 by rivets 18 so that the sleeve 16 and ring 17 are permanently located in the axial sense. The rings 14 and 15 are of slightly less axial width than the sleeve 16 so that they can move freely in the radial sense between the sleeve 13 and the ring 17.

A small lip 19 at the inner edge of the end ring 17 extends axially downstream whereas the inner, or stepped gap, spring ring 14 has a similar small lip 20 on its outer edge which extends axially upstream. A small annular chamber is thus left between the end ring 17 and the inner spring ring 14 into which pressure air from the high pressure side of the valve leaks and so finds its way between the flat downstream side of the end ring 17 and the upstream edges of the inner and outer spring rings 14 and 15 to a position behind the spring rings where it acts to close the latter into sealing engagement around the circumferential edge of the disc of butterfly 11. It also serves to urge the downstream side faces of the spring rings 14 and 15 into sealing engagement with the upstream end face of the sleeve 13, as shown in FIGURE 3.

The circumferential edge of the disc or butterfly 11 is chamfered in a direction axially of the bore. Also the inner surface of the inner spring ring 14 at the upstream and downstream edges of the latter is chamfered to prevent the formation of a step between such inner surface of the inner ring 14 and the adjacent portions of the bore of the valve body 1 when the ring 14 contracts into close sealing engagement with the circumferential edge of the disc or butterfly 11.

I claim:
1. A butterfly valve comprising a valve body having a bore providing a fluid passage therethrough, said body having an annular sealing face extending peripherally of the bore, facing upstream, and lying in a first plane normal to the axis of the bore and the flow of fluid therethrough, a valve disc pivotally mounted within said bore about an axis which is inclined to and intersects said plane to control fluid flow through the passage, the valve disc having a closed position in which its peripheral edge lies in a second plane normal to the axis of the bore and upstream of said first plane, and at least two concentrically arranged, gapped spring sealing rings arranged in the bore immediately upstream of said sealing face, the rings extending axially on either side of said second plane and the innermost ring being dimensioned to seal around the peripheral edge of the disc when the latter is in its closed position, the gap in the innermost ring being of stepped configuration to prevent axial leakage therethrough and being defined by end portions provided with overlapping tongues, the engaging faces of said tongues slidably contacting in a plane normal to the flow axis and the gap in the outer ring adjacent to the innermost ring being arranged to prevent leakage from the end of one tongue to the end of the other tongue around the outer peripheral surface of the innermost ring, the rings having sealing surfaces on their downstream edges which are forced into sealing contact with said annular sealing face by the action of the high pressure fluid on the upstream edges of the rings when the disc is in its closed position.

2. A butterfly valve according to claim 1, including a step having a radial surface in the bore of the valve body, said surface facing downstream, and a sleeve within said bore and downstream of the step, the sleeve having an upstream end surface which, together with the step, forms a recess in the bore in which said sealing rings are arranged, and wherein said upstream end of the sleeve forms said annular sealing face.

3. A butterfly valve according to claim 2, including an end ring located between the radial surface of the step and the sealing rings, a lip which extends axially upstream from the outer edge of the innermost ring, and a lip which extends axially downstream from the end ring and which is spaced radially inwardly from said first-mentioned lip, the space between the lips forming an annular chamber into which fluid from the high pressure side of the valve can pass to force the sealing rings against said annular sealing face when the valve disc is in its closed position.

4. A butterfly valve according to claim 1, wherein the edges of the inner surface of the innermost ring are chamfered to afford an easy entry for the peripheral edge of the valve disc as the latter moves to its closed position.

5. A butterfly valve according to claim 1, wherein the peripheral edge of the valve disc is convexly contoured to provide substantially line contact between the inner surface of the innermost sealing ring and said peripheral edge when the valve disc is in its closed position.

References Cited in the file of this patent
UNITED STATES PATENTS

| | | |
|---|---|---|
| 1,250,991 | Dittmer | Dec. 25, 1917 |
| 1,671,069 | De Wein | May 22, 1928 |
| 1,927,507 | Sommers | Sept. 19, 1933 |
| 2,882,010 | Bryant | Apr. 14, 1959 |

FOREIGN PATENTS

| | | |
|---|---|---|
| 125,962 | Austria | of 1931 |
| 562,858 | Germany | of 1932 |
| 689,630 | Great Britain | of 1953 |